United States Patent
Unbehand

[19]

[11] Patent Number: 5,823,876
[45] Date of Patent: Oct. 20, 1998

[54] STEERING WHEEL SIMULATION ASSEMBLY

[76] Inventor: Erick Michael Unbehand, 21 Longstreet, Irvine, Calif. 92720

[21] Appl. No.: 642,436

[22] Filed: May 3, 1996

[51] Int. Cl.[6] .......................................................... A63F 9/14
[52] U.S. Cl. ............................................... 463/37; 273/442
[58] Field of Search ................................. 463/36, 37, 30, 463/38; 74/492; 273/148 B, 442; 434/63, 65, 307 R, 373; 364/30, 410; 464/89

[56] References Cited

U.S. PATENT DOCUMENTS

| | | | |
|---|---|---|---|
| 4,474,372 | 10/1984 | Karasawa ..................................... | 434/63 |
| 5,272,932 | 12/1993 | Koyamatsu et al. ........................ | 74/492 |
| 5,368,484 | 11/1994 | Copperman et al. ....................... | 434/69 |

*Primary Examiner*—George Manuel
*Attorney, Agent, or Firm*—Michael McEntee

[57] ABSTRACT

A computer driven video game accessory having a steering wheel or yoke coupled to a steering shaft, and having the steering shaft mounted in a frame. The steering torque applied by a player is opposed by non-linear torques created by a crank coupled to the steering shaft and a special kind of double acting pneumatic/hydraulic cylinder. The preferred embodiment includes an electric motor coupled by a clockwork to the steering shaft to superpose additional torques to simulate operation of boats, airplanes, cars, trucks, and the like. The player experiences an opposing torque which is composed of several torques, thus giving a richer, more complex driving experience. One major object of the invention is that a player who is physically strong and thus turns the wheel quickly will encounter more instantaneous opposing torque than would a weak player who turns the wheel slowly. Another object is to minimize the size of the electric motor without introducing large amplification of the inertia of the electric motor as a result of a large ratio of speed reduction in the clockwork.

8 Claims, 4 Drawing Sheets

STEERING WHEEL SIMULATION ASSEMBLY

TECHNICAL FIELD

The scope of the invention includes a computer driven video game accessory having a steering wheel or yoke. The torque applied by a player is opposed by a complex set of torques superposed by a pneumatic/hydraulic system and an electric motor system.

BACKGROUND ART

There has been a long felt need for a low cost, portable apparatus by which a student driver or video game user may receive a more realistic simulation of the operation of an automobile, truck, bus, motorcycle or airplane. Particularly the "feel" of the torques simulating road conditions, tire vibration, sliding, camber are all important clues to the student driver or video game user as to whether the simulated driving experience is authentic.

Much of the technical development of simulators has been done, not specifically for driving simulators, but for simulation of airplane operation in ground based simulator equipment. The technical problems are similar and therefore the prior art should include examination of the airplane simulation patents. This is particularly the case because video games displaying car driving often also can display flight simulations. Therefore, we will include flight simulator technology in this review of the prior art.

Perhaps, the first successful effort to provide realistic "feel" in a student pilot vehicle simulator appears to have been achieved by Paul E. Grandmont in 1950. In that year, he filed a patent application and assigned it to the Curtis-Wright Corporation. The application listed many of the objectives to be achieved in order to successfully simulate the "feel" of the opposing force through a control stick.

His design utilized a servo-motor operating from signals from a computer to operate a positive displacement double action hydraulic pump. On Sep. 3, 1957, U.S. Pat. No. 2,804,698 was granted to Mr. Grandmont on that invention. In his patent, at col. 1, lines 3 and 23 to 35, he sets forth several of the objectives which have guided simulator builders for the next 56 years. "It has been proposed to apply to the respective simulated aircraft controls of grounded flight trainers, [1.] forces variable according to the simulated airspeed and [2.] to the control displacements, one example being a motor-tensioned spring arrangement for [3.] opposing the control pressure applied by the student pilot. The controls so loaded are intended to simulate in operation actual aircraft controls, namely the aileron, elevator and rudder controls which tend [4.] to be centered by air resistance at the control surfaces, this resistance being primarily a [5.] function of airspeed. In general, the prior art devices are complicated and not sufficiently [6.] accurate throughout the required [7.] range of operation to make realistic the [8.] control "feel" for certain types of aircraft, particularly the high-speed aircraft wherein a greater degree of fidelity in control loading simulation is required within a narrow range near the neutral position of the control. That is, in a case of high speed aircraft the air resistance loading for comparatively small control displacements may be considerable and the normal range of control movement is restricted as compared with low-speed aircraft. Also, in the prior art devices the control "feel" may be unnatural by reason of [8.] inertia effects, [9.] servo response and related factors.

"The 'feel' of the controls therefore during simulated flight maneuvers involving variable factors such as [10.] rapidly changing control displacement, [11.] varying airspeed and [12.] aircraft attitude, becomes an increasingly important feature in pilot training as the rated speed of the aircraft increases." [Col. 1, lines 23–45.)

During the next 46 years, industry relied heavily on large electric servo motors and complex hydraulic systems. We list a few of the examples to show the difficulty of solving the entire set of technical problems involved in achieving the correct "feel" in a simulator.

Surprisingly, not until recent years has the literature disclosed a major problem with the prior art which problem is that it assumes the operator is a grown man who will not be overpowered by the servo system motors. By contrast, my invention is aimed for use in the home, where it is entirely expected that children will use the device, as well as large, strong adults. A servo motor driving a hydraulic piston could easily apply so much force so quickly that the child is injured by spinning of the steering wheel or by motion of the control stick. This is a serious problem. As will be seen, my invention does solve that problem and my invention does achieve many of the 12 objectives set forth by Mr. Grandmont 50 years ago.

In 1961, U.S. Pat. No. 3,024,539 granted to Albert J. Rider described an improved arrangement for connecting the control [steering] wheel to transducers provided to measure displacements of a simulated control wheel. However, at col. 2, lines 45–50 describe the technical and economic trade off which the prior art had to accept in simulators at that time. ". . . and no cogging or nonlinearities occur over the operating range. The spring system applies force at a constant rate, and it is suitable for low-cost trainers in which variation of control forces as a function of dynamic pressure is not deemed economically justified."

By contrast, in my invention, I make it possible to selectively cause nonlinearities in the torque in order to achieve the "feel" of the dynamic pressure on the tires, road vibration, tire shimmy, and I make the simulator adapt to the drivers' individual strength, particularly as the simulated vehicle is making a high speed turn.

The first mention we have found of computed control of a simulator is in an aircraft training apparatus for the ground training of pilots disclosed in U.S. Pat. No. 2,937,458 granted May 24, 1960 to E. J. Leuthold and assigned to Curtis-Wright Corporation. Its principal object was to realistically simulate the feel of cable stretch in aircraft controls. It describes the "a control loading motor 2 for opposing movement of the pilot's control with reduction gearing indicated at 3" [Col. 1, line 65]. Although FIG. 1 of that patent refers solely to the elevator control of an airplane, the concept of applying a torque to a pilot control is instructive in showing the prior art as of 1960. The patent continues, "The motor is energized so as to resist the movement of the pilot's control from neutral by a computed force voltage that is a function of the simulated air speed and the degree of control displacement. This voltage is variable in polarity and magnitude so as to vary the motor torque accordingly. A portion of the force computer is represented by a potentiometer 9 that is also connected through it reduction gearing at 10 to the lines 8b and 8 so that the potentiometer is positioned according to the control movement." [Col. 2. lines 8–18.] "As compared with the prior use of springs, which tend to introduce "sloppiness" in the simulated loading, the present device is sufficiently realistic and precise so as in practice to match the torque-deflection characteristic of the aircraft control to be simulated. This has not been accomplished heretofore." [Col. 3, lines 31–35.]

Thus, in 1960, the level of technology permitted a servo-motor "brute force" approach, wherein the motor operated through a gear box and the motor was the sole source of torque to resist the pilot. A strong pilot could overwhelm the motor/gear box. A weak pilot could be thrown about by the torque imposed by the motor/ gear box. The gear box amplified the inertia of the motor, so that sudden rotation by the pilot would be completely stopped. Thus, electrically introducing random, non-linear torques to simulate vibration would be reduced to the point of ineffectiveness. One cannot have "brute force" and also a light touch unless one uses our hybrid system.

U.S. Pat. No. 4,227,319 granted Oct. 14, 1980 to Guy et al summarizes the level of technology at that time as to Artifical Feel Systems ("AFS"). "In order to provide the pilot with the reactions required for correct flying of the aircraft, AFS's, also known as feel-force systems, are located in the linkages before the servocontrols and transmit to the pilot's controls and therefore to the pilots forces similar to the real reactions of the control surfaces." [Col. 2, lines 25–29.] The tremendous complexity, use of servo controls and hydraulics shown suggests that there would be no hope for achieving realistic simulation in a steering wheel simulator for sale at low prices for use by consumers.

U.S. Pat. No. 4,024,651 granted May 24, 1977 to Lantrip described the use of compressed nitrogen in hydraulic accumulators [FIGS. 3, 46,48,50,52] in a hydraulic actuated flight simulator system. Again, the sheer complexity of that system taught away from the use of hybrid compressed gas/hydraulic fluid utilizating in a low cost, home use, steering wheel simulator for use by consumers.

In 1974 videogames came on the market in the United States. By 1980, home personal computers became widely available at an affordable cost. Soon, flight simulator and race car video game simulation software came on the market.

U.S. Pat. No. 4,478,407 granted Oct. 23, 1984 to Manabe describes a videogame operated by a player seated in a simulated cock-pit or driver cabin of an airplane or car. A seat tilting system is described, operated by a hydraulic pump [Col. 2, line 29]. Control over that tilting system is described: "Right and left turns, a pull-out and push-in of the steering wheel device 5 turns on and off the microswitches 27,28,35,36. The turn-on and off of the microswitches change over solenoid valves 43, 43 of the hydraulic circuit shown in FIG. 4 causing the support frame 9 to incline backward and forward, and right and left." [Col. 2, line 65+]. There was no effort to have the steering wheel resist the motions imposed by the driver or to impart through the steering wheel any mechanical "feel" for the road.

An initial effort by the videogame industry to impart some "feel" to the steering is described in U.S. Pat. No. 4,599,070 granted Jul. 8, 1986 to Haldky et al. FIGS. 25–29, show a chain 306 over a sprocket 302 attached to the steering yoke 30. A lever system and springs 280a and 281a creates torque linearly proportional to the rotation of the wheel. A "moveable fulcrum 283 . . . is slideably moveable . . . . A screw shaft 289 a linear motor 291 is threadedly connected to the base of the fulcrum bracket 287. The linear motor is coupled to and controlled by the computer 24." [Col. 15, lines 3, 9–12 and Col. 17, lines 35–45]. Thus, the motor is solely to provide a slow adjustment to the strength of the springs, rather than provide instantaneous adjustment for rapidly changing light conditions. Once again, if the wheel is suddenly let go, it will snap back to a neutral position, and that snap back is powerful and could cause harm to the driver. By contrast, my invention prevents the snap back, and also modifies the purely linear torque increase felt as the steering wheel or steering yoke is rotated.

U.S. Pat. No. 4,659,313 issued to Kuster et al. on Apr. 21, 1987. Kuster utilized a crank and biasing means to achieve a return to neutral.

Two years later, U.S. Pat. No. 4,861,269 granted Aug. 29, 1989 to Meenen and assigned to Grumman Aerospace Corp. described a sidestick grip with a spring device linked to a damper for damping grip movement in the pitch and roll directions. The spring devices have (1) vaiable spring preload bias thereby enabling adjustments of the breakout forces; and (2) adjustable stick neutral position. The patent recognized the need to adapt the simulator control to the "build" or physical size of the student pilot in order to enhance the "tactile cues to the pilot so he may gauge his control inputs." [Col. 1 and 2] A bidirectional 52 with manually adjusted flow of a hydraulic fluid is shown linked to a spring cartridge 46 in FIG. 1. A screw adjustment is provided 47 in FIG. 2 of thread rod 44. [Col. 3, lines 37–40.] "It is to be noted that the resisting force for such a positional changes of the sidestick grip is proportional to the rate of change occurring in the rod of the damper 52."

Although '269 recognized the use of a hydraulic damper as a means of damping force which a strong pilot might apply to the sidestick controller, the patent does not teach the concept of adapting the simulator to the broad range of users, from 10 year old children to large very strong men. Unlike my invention, no motorized instantaneous feedback is superposed onto the bidirectional damper, and unlike my invention, it appears that the hydraulic cylinder is filled solely by relatively incompressible hydraulic fluid. My invention depends on the hydraulic damper being partially filled with hydraulic fluid and the rest filled with compressed gas.

U.S. Pat. No. 5,203,563 granted Apr. 20, 1993 to Loper and assigned to Atari Games Corp. utilized a motor shaker which created a random shaking in a steering yoke.

Representative of the art in 1994 is a mouse yoke assembly for interfacing with a computer through the sensing mechanism of a mouse described in U.S. Pat. No. 5,317,336 granted May 31, 1994, to Kenneth J. Hall. This invention shows no feature of imposing any torque on the steering wheel 24 and merely detects rotation and translation of the steering wheel. The simulation is entirely in the video display screen, with no simulation of torque resistance felt by the driver. The advantage of '336 is extreme low cost and accessiblity to the mass market. Hall notes that, "There are other means known in the art for interfacing with simulation software and which give the operator a more realistic experience. For example, U.S. Pat. No. 4,659,313 issued to Kuster et al. on Apr. 21, 1987 discloses a control yoke apparatus for computerized aircraft simulation having a steering wheel mounted to a shaft which terminates in an L-shaped crank mechanism. The crank mechanism is attached to a standard joystick via a piece of resilient elastic rubber-like material. The crank mechanism transforms rotation of the wheel into rotation of the joystick to thereby maneuver the aircraft simulated on the computer monitor." [Col. 1, lines 41–53.]

Also in 1994, the commercial flight simulator industry was seeking to build flight simulators for specific conditions of Boeing airplanes. U.S. Pat. No. 5,286,203 granted Feb. 15, 1994 to Fuller et al shows a servo valve 42 and hydraulic motor 40 used to simulate the potentially 135 pound feet of torque which a pilot would have to exert on trim wheel 30 to provide emergency control for the airplane in the event of electrical failure in the airplane. [Col. 1, lines 58–65; Col 4, lines 8–12.] The patent teaches that even as of 1994, "brute force" simulation environments seemed invariable to be met by motor driven hydraulic motor means.

U.S. Pat. No. 5,368,484 granted Nov. 29, 1994 to Cooperman, et al and assigned to Atari Games Corp. describes a driver training system for a user of a simulated vehicle. The system includes input devices for controlling the simulated vehicle, a video display having three dimensional graphics, a computer, modeling software for determining position information based on the input devices, atmospheric effects software to simulate time-of-day and weather conditions, and realistic operating feedback software for simulating on the input devices the feedback normally experienced with operating the vehicle. One aspect of the preferred embodiment is a system including a low frequency speaker mounted on an enclosure adjacent to the simulation user's seat through which road feel cues such as hitting an object are transmitted to the user in response to signals received from the computer. Another aspect of the invention is a system for simulating the feel to the user of anti-lock brakes on a brake pedal in response to signals received by the computer." [Abstract of '484.] Essentially, this patent mentions all the things already well known in the United States by 1980, and is helpful as a partial listing of prior patents. The patent assumes the use of the "Control Device such as a Steering Wheel for Video Vehicle Simulator With Realistic Feedback Forces" which title is for U.S. Pat. No. 5,044,956. [Col. 7, line 1–3.] issued in 1991.

That 1991 patent, U.S. Pat. No. 5,044,956 granted Sep. 3, 1991 to Behensky et al and assigned to Atari Games Corp. describes "An apparatus and method for simulating the forces acting on the steering wheel or other control device of a vehicle. The apparatus uses an electrical motor coupled to a steering wheel in the preferred embodiment. The electrical motor is driven by a computer running software which received data regarding the real world forces which would be acting upon a real steering wheel in a car under similar conditions. A software driver coupled to a position-sensing transducer on the steering wheel calculates the steering wheel position and velocity and sends this data to a model process not forming part of the invention. The model process then calculates the conditions affecting the simulated vehicle and outputs data reflecting the real world forces which would affect the steering wheel of the actual car under similar conditions. This data is used to calculate a force number which in turn drives a driver amplifier and motor combination coupled to the steering wheel . . . " [Abstract of '956.] FIG. 2 shows an electric motor mounted on the steering shaft itself thus creating the risk of runaway spinning if the motor overcomes the strength of a 10 year old child user. The motor has a "1 foot-pound/ampere" torque. [Col. 3, line 9.] and a top speed of 700 rpm. [Col. 3, line 12.] Clearly, if there is runaway twisting, a child could get hurt. FIG. 5 shows a "mechanical diode" which the inventor uses to address the safety problem. "FIG. 16 is a routine which scales the force applied to the steering wheel according to the position set by the player for the seat in which the player sits when playing the game for safety purposes." [Col. 2, lines 65–68.] That patent emphasizes that it is directed solely to electric motor generation of all torques.

Prior Art of Peripheral Interest

Because motorized simulators are found in a number of fields, I include the following references for the sake of completeness.

U.S. Pat. No. 5,125,843 granted Jun. 30, 1992 to Holloway describes the use of a potentiometer 21 the steering wheel shaft.

Various toys intended to simulate piloting of a airplane and which were on sale or in public use in the United States are mentioned in U.S. Pat. No. 4,932,913 granted Jun. 12, 1990 to Raviv et al. To my knowledge, none of those toys had hybrid hydraulically damped, motor damped and motor augmented steering wheel simulation means.

The model airplane industry was also trying to provide more realistic simulation of flying model airplanes. U.S. Pat. No. 4,386,914 granted Jun. 7, 1983 to Dustman describes an apparatus for use with a model airplane radio remote controller. It is of interest because of the spring centering lever arms 84 and the stick centering springs 43 shown in FIG. 1. "FIG. 15 is a perspective view of a wheel assembly 112 which may be used in place of the control sticks 35 and 90 for controlling the operation of the aircraft." [Col 6, line 64–66.]

U.S. Pat. No. 5,277,584 granted Jan. 11, 1994 to DeGroat et al describes a vehicle vibration simulator system. A Programmable logic controller (PLC) operates a number of devices including an air piston 122 in FIG. 5 to operate a steering wheel. I believe this system would lack the instantaneous response characteristics needed for use in a video game home use environment.

SUMMARY OF THE INVENTION

The invention is an input/output device for a computer. Turning a steering wheel or yoke rotates a transducer which sends a signal to the computer. The computer outputs a signal which actuates an amplifier. The amplifier sends electricity to a motor in the device. The motor causes the steering wheel to turn. However, in this invention, the motor does not provide the entire source of "opposing torque" to the steering wheel. Instead, a combined pneumatic/hydraulic means provides most of the opposing torque.

The steering torque applied by a player is opposed by non-linear torques created by a crank coupled to the steering shaft and a special kind of double acting pneumatic/hydraulic cylinder. The preferred embodiment also includes an electric motor coupled by a clockwork to the steering shaft to superpose additional torques. It is an object of the invention to authentically simulate the steering experienced during the operation of boats, airplanes, cars, trucks, and the like. The player experiences an opposing torque which is composed of several torques, thus giving a richer, more complex driving experience.

One major object of the invention is that a player who is of large build, or is physically strong, and thus turns the wheel quickly, will encounter more instantaneous opposing torque than would a weak player who turns the wheel slowly. Unlike the prior art, the invention permits a much smaller electric motor than the prior art, because most of the opposing torque arises from the pneumatic/hydraulic cylinder.

Another object is to minimize the size of the electric motor so as to avoid introducing large amplification of the inertia of the electric motor as a result of a large ratio of speed reduction in the clockwork. For a given control torque, the motor size, including power supply and drive electronics can be reduced since the primary torque is supplied by the pneumatic/hydraulic system while the motor is only used to supply the "deltas." The motor torque may be added to or subtracted from that of the pneumatic/hydraulic system.

Another object is to combine a partially filled double acting hydraulic cylinder with a crank coupled to a clockwork coupled to a motor and coupled to a steering wheel.

The overall result is the authentic simulation of all the forces felt by a driver when driving a real car on a real roadway.

Another object is to have the forces variable according to the simulated speed of the vehicle. Sudden wheel rotational displacement is opposed by a non-linear torque which contains surprises, as opposed to the purely predictable "proportional" opposing torque described in the prior art. The secret to a really authentic "feel" of the vehicle resides in the non-linear authentic torque vibrations. These instantaneous torques provide the "feel" of the road or aircraft. This greater degree of fidelity in control loading simulation is achieved even when the steering wheel is near center.

The steering wheel does not snap back or runaway from the driver of pilot if they suddenly let go of it. The steering wheel returns to center subject to modulation by the motor.

The design is exceptionally simple, low in cost to make, yet it has sufficient accuracy throughout the required entire range of operation.

The "feel" is not unnatural by reason of servo response effects such as "off shoot" even when there is a rapidly changing control displacement, varying vehicle speed and attitude. The computing badwidth is greatly reduced when compared to what is required in a typical closed-loop servosystem. The motor typically needs far fewer command updates than would be required in a closed-loop system.

"Latency" requirements (the time between the input encoder and supplying the next torque correction) are greatly relaxed since quick player motions are primarily handled by the pneumatic/hydraulic system.

When used with existing softwear that does not support the active torque feedback required to operate the motor, the pneumatic/hydraulic system alone does an adequate job of supplying a realistic "feel" of vehicle operation. This in turn provides fault tolerance by providing some "feel" even if the motor, amplifier, or computer output signal fails.

Another object is to provide greater energy efficiency because the motor can be much smaller and does not have to be on except during the "deltas."

DISCLOSURE OF THE PREFERRED EMBODIMENT OF THE INVENTION

Figure 1:
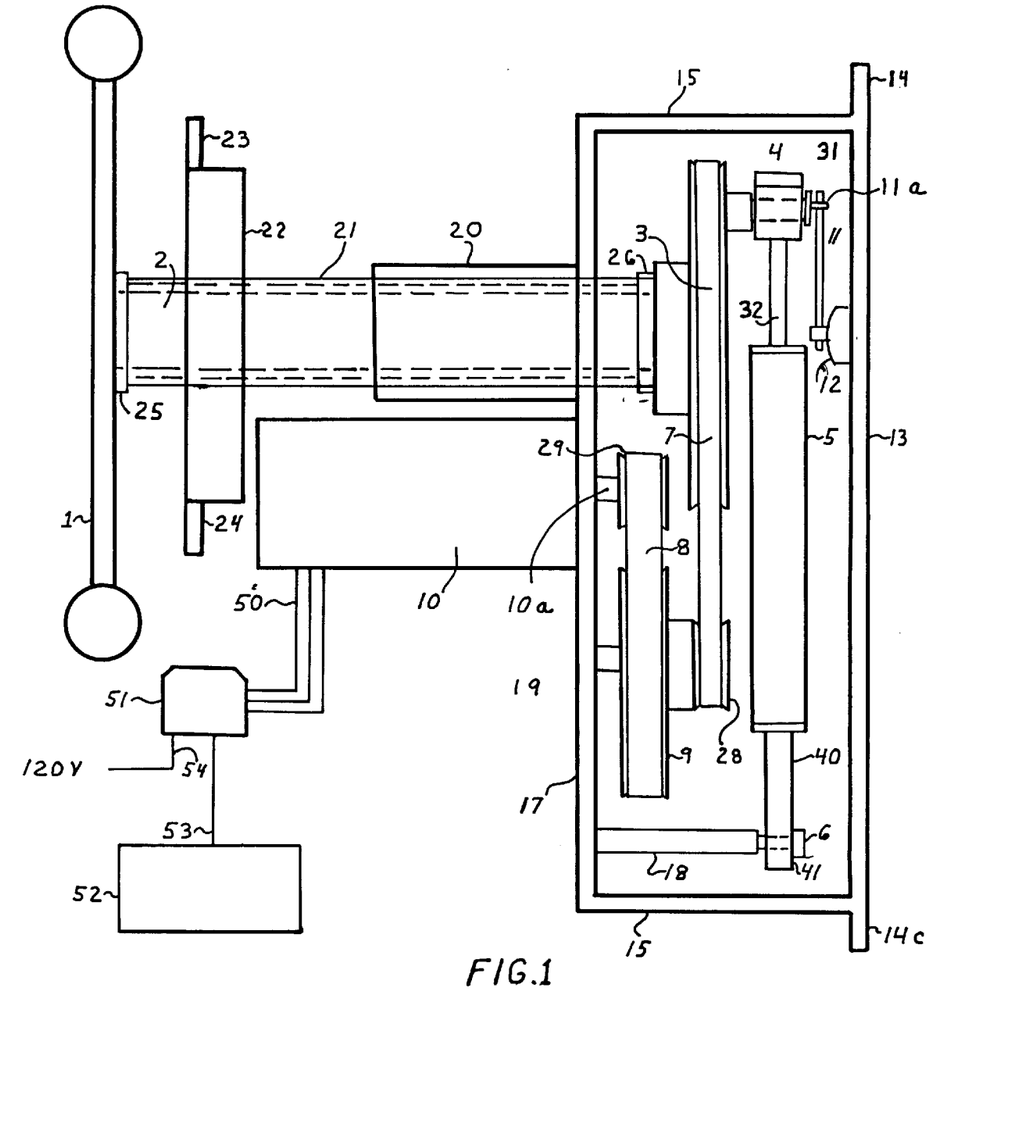
FIG. 1 is a plan view showing the steering wheel 1, steering shaft 2, frame 14, clockwork, motor 10, crank/pulley 3, and related parts.

In the preferred embodiment, the vehicle being simulated is a car. Referring to FIG. 1, there is a frame 15, mounting bosses 14 and 14a, a face plate 22, mounting bosses 23 and 24, a steering shaft 2 mounted for rotation with respect to the frame by bearing collars 25 and 26, a steering wheel 1 secured to the steering shaft at one end, a motor 10 connected to the frame 15 and having a motor shaft 10a, a clockwork means maintains a fixed ratio of rotation between the motor shaft and the steering shaft. In the preferred embodiment, that clockwork means comprises motor shaft 10a on which is secured timing belt pulley 29, timing belt 8, pulley 9 mounted for rotation on idler shaft 19, pulley 28 secured to pulley 9, timing belt 7, timing belt pulley 3 secured to steering shaft 2. Pulley 3 also serves as a crank arm and has pin 4 secured to pulley 3. Mounted for rotation on pin 4 is block 31. Secured to block 31 is one end of piston rod 32. Computer 52 is typically a personal computer. Cable 53 is typically a RS-232 type cable widely used to connect personal computers to video game accessories. Amplifier 51 provides power via cable 50 to motor 10. Cable 54 connects the amplifier to ordinary 120 volt house current.

Figure 2:
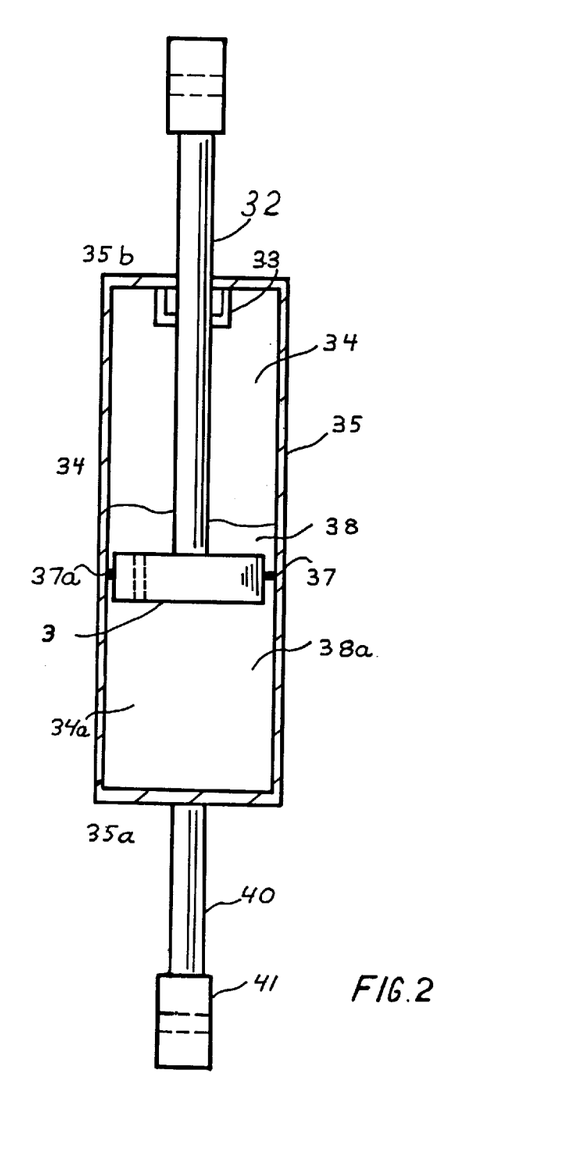
FIG. 2 is a side orthogonal view of the hybrid spring piston/damper generally referred to in FIG. 1 as 5.

In FIG. 2, piston rod 32 passes through seal 33 and into sealed chamber 34 within cylinder 35 which has end caps 35b and 35a. The rod 32 is secured to piston 36 which is free to move axially within the sealed chamber 34 and 34a. Sliding seals 37, 37a are secured in piston 36. Relatively incompressible hydraulic fluid 38, 38a in a preselected quantity is within the sealed chamber 34 and 34a, and is free to flow through port 39 between chambers 34 and 34a. Rod 40 connects cylinder end cap 35a to block 41. Block 41 is in turn mounted for rotation on pin 18.

In operation, pin 4 is pushed away from pin 18 by hybrid hydraulic cylinder 5. At the same time, motor 10 is connected in fixed ratio of rotation to the steering shaft 2. Electric wires 50 connect motor 10 with electrical motor driver 51, which is controlled by signals from computer assembly 52. Computer 52 receives signal from, among other sources (not shown) a potentiometer 12. Potentiometer 12 is mechanically linked to the rotational position of steering wheel 1, steering shaft 2, pulley/crank 3, pin 4, by arm 11 which intersects a pair of tines 11a secured to pin 4.

A personal computer 52 utilizing a common RS-232 cable 53 and running one of the simulation programs widely sold in the United States, receives the voltage from the potentiometer, and using the simulator program and any hardware which comes with that program, calculates the position, change of position, rate of change of position, and calculates the amount of current and voltage to apply to motor 10. The signal to the motor is then returned to amplifier 51 via cable 53. The signal operates standard semiconductor power circuits with 51 and outputs power to motor 10 via cable 50.

The motor 10 superposes its torque onto the torque created by force applied by hybrid cylinder 5 against crank pin 4.

Figure 3:
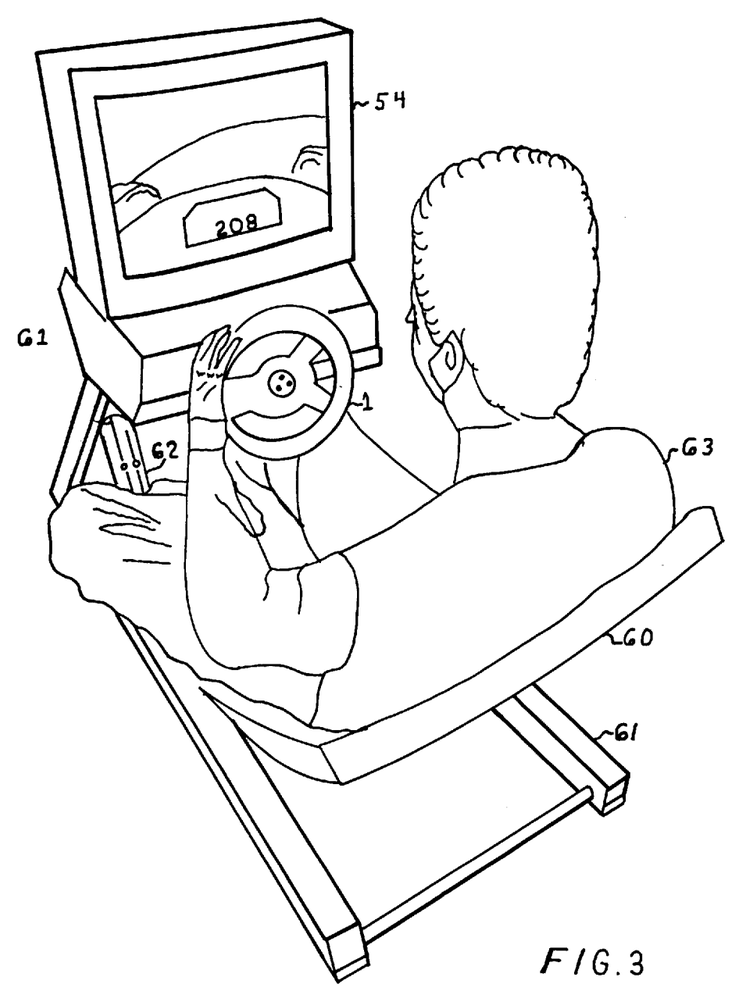
FIG. 3 is a side view showing the steering wheel 1, frame and clockwork, motor 10, and related parts.

FIG. 3 shows a player 63 sitting in seat 63 mounted in a frame 61 on which is mounted monitor 54. Under the monitor 54 is located steering wheel 1 which is mounted as shown in FIG. 1. The details of the mounting is not visible in FIG. 3. Referring to FIG. 3, a player sits in the seat 60 in frame 61 and operates steering wheel 1 while facing a screen of a television (not shown) which television is controlled by computer assembly 52 (shown in FIG. 1).

Figure 4:
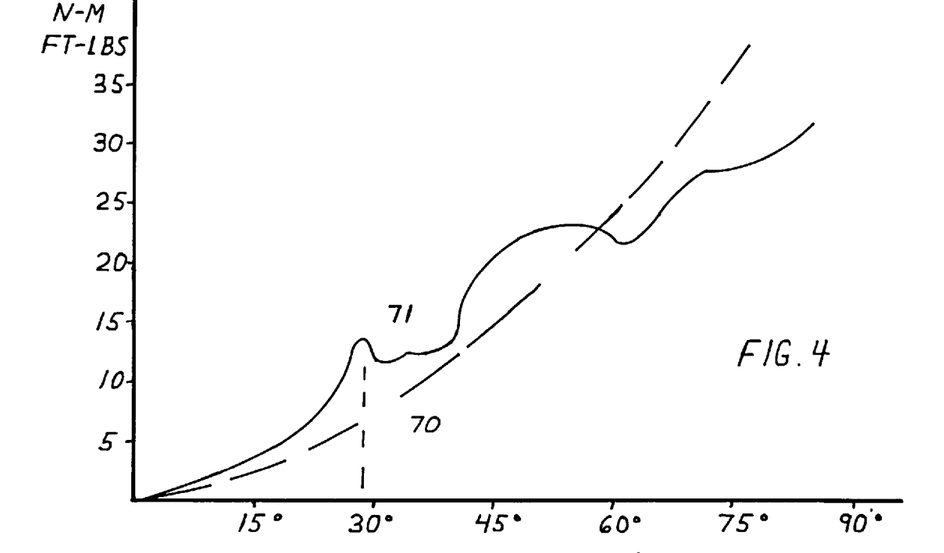
FIG. 4 is a graph of torque on the vertical axis versus rotational displacement of the steering wheel 1 on the horizontal axis.
Figure 5:
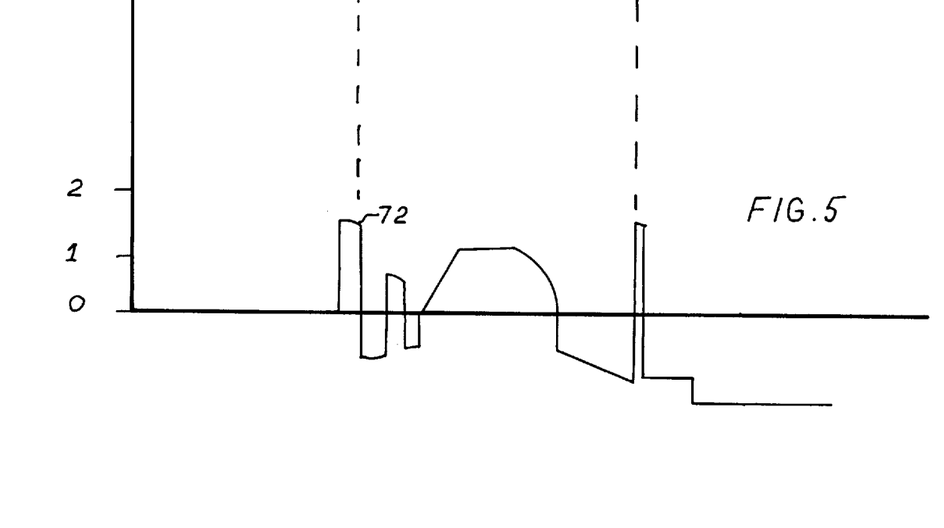
FIG. 5 is a graph of torque from the motor 10 on the vertical axis versus rotational displacement of the steering wheel 1 on the horizontal axis.

Referring to FIG. 4, we see on the vertical axis the torque experienced by the player at the steering wheel. On the horizontal axis we see the rate of wheel rotation in degrees of arc per second. Suppose a 10 year old player starts to rotate the wheel clockwise to 30 degrees. As she does so, she will feel increased torque resisting her. This is caused by the cylinder 5 acting against pin 4. The force is shown on FIG. 4 by dotted line 70. Soon, a player, no matter what age, would memorize how much force is experienced by a certain rotation, and the player would become less involved, less enthused by the game. What is needed is to introduce the effect of tire vibration as the tires hit simulated pot holes, or the tires track or camber or drift. To do so, the motor 10 responding to signals from the computer via device 51 will impose a torque on the clockwork of pulleys. This superposition force is shown in FIGS. 4 and 5 as 71 and 72 respectively. FIG. 5 shows the torque output from the motor 10.

The motor 10 thereby superposes its action onto the action of the hybrid cylinder 5 and the result is a combination of the torque 72 of 2 lb-ft. from the motor 10 combined with torque of 8 lb-ft imposed at 30 degrees by cylinder 5 against the crank, to cause the player to experience 10 lb-ft of torque.

Suppose the vehicle is simulating going through a curve of decreasing radius. The player must then keep turning the wheel and as she does so, she experiences not merely a linear increase in torque, but varying torque resulting from the motor 10 being operated either clockwise or counterclockwise and thereby superposing its torque onto the crank torque. For example, "steering lightening" (loss of traction as if on ice or when tires begin to break loose during high-speed cornering) can be simulated by having the electric motor help the operator turn the wheel, i.e. the electric motor does NOT oppose the player turning the steering wheel, but instead, assists the player to turn the wheel even further. The motor does this in a short sudden "delta" of torque so the player has the sense that the tires have slipped and the player has lost control of the vehicle. This lends excitement to the video game.

The motor can also function as further dampening the rate of turning by using the regenerative effects of the motor. This can be used to make the wheel feel "heavy" as when the vehicle is driving through sand or mud.

In the prior art, very complex systems are needed to help the computer control steering wheel return to center. By contrast, this invention automatically returns to center without any calculation. This is particularly useful since the pneumatic/hydraulic system works with all simulation software programs without any modification. Future software could support the active feedback system, which might be included in upgrades. Thus, the market for this invention is much larger than input/output hardware tied solely to a particular software program.

The motor can be a permanent magnet direct current type. The cost of such a motor is several times lower than that of a 3 phase motor or stepping motor. Further, such motors are easy to repair, are very rugged, and are well understood by nearly all repair people.

The power supply system likewise is simple. To ensure smoothness of operation, a minimum feedback rate of about 10 hertz would conceal the action of the motor while achieving smooth ramping of torque, if that is desired. Well known pulse width modulation methods provide the electric current to the d.c. motor.

Again, an important feature of the invention is that suppose the player is 200 lb and very strong. The player will easily overpower the motor with sudden rotations, but the hydraulic fluid within the cylinder will provide a large opposing torque, initially. As fluid passes through port 39 of piston 36, the strong player will experience force proportional to the force he exerts turning the wheel. Thus, the invention is adaptable to a wide variety of players.

Suppose either the 10 year old child or the 200 pound man suddenly lets go of the wheel. The result is a rapid return to center, but the cylinder 5 damps the sudden rotation, thus allowing a safe return to center without breaking an arm or injuring the hands of the player. This safety feature is entirely non-electronic and, unlike the prior art, does not depend upon complex, computerized interrupts.

What we claim is:

1. In a computer driven video game accessory having a steering wheel mounted on a steering shaft, and the steering shaft mounted in a frame, the invention comprises
   a. a crank mounted to rotate the steering shaft;
   b. one or more cylinders sealed at one end and having a seal at the other to permit each cylinder to have a sliding rod to move with respect to the seal means and each sliding rod having its own piston attached to the end of the rod within the cylinder,
   c. a preselected quantity of liquid disposed within the cylinders;
   d. a preselected quantity of compressible gas disposed within the cylinders;
   e. the action of the piston in the cylinder causes liquid and gas to flow between a first chamber and a second chamber;
   f. flow restriction means between the first chamber and second chamber regulate flow due to pressure difference between the two chambers, said pressure difference caused by movement of the pistons within the cylinders whereby, force applied by the compressed gas within the cylinders acting through the piston rod against the crank, and momentarily against the rest of the area of the piston causes continuing force against the crank, but also, as the liquid is forced from one chamber to the other, the liquid causes non-linear momentary forces opposing the rotation of the steering wheel.

2. The invention in claim 1 further comprises position detecting means coupled to the steering shaft.

3. The invention in claim 1 wherein the steering wheel is a steering yoke as used in aircraft.

4. In a computer driven video game accessory having a steering wheel coupled to a steering shaft, and having the steering shaft mounted in a frame, the invention comprises:
   a. a crank coupled to the steering shaft,
   b. a spring means coupled to the crank to bias the crank to bottom dead center,
   c. a damping means cooperating with the spring means to oppose the rate of rotation, as the steering wheel is rotated by a player,
   d. said spring means and damping means are combined within a double acting cylinder which, double acting cylinder comprises, (1.) a piston slidably mounted within the cylinder and thereby defining two chambers within the cylinder, (2.) a preselected quantity of relatively incompressible liquid contained within the cylinder, (3.) a preselected quantity of compressed gas within the cylinder, (4.) a piston rod connected to the piston and slidably extending through one end wall of the cylinder to and linking with the crank outside the cylinder, (5.) leakage means to permit flow of the liquid and gas from one chamber to the other within the cylinder, whereby a sudden rotation of the steering wheel by a physically strong player is opposed by two torques, the first is related to rotational displacement of the wheel, and the second is non-linear and is determined by the rate of rotation of the wheel, while a physically weaker player would experience proportionally less torque.

5. The invention of claims 4, further comprising
   a. an electric motor mounted in the frame, b. clockwork means linking the electric motor to the steering shaft.

6. The invention of claim 5 wherein the clockwork means are mounted in the frame and comprise:

a. a 1st pulley secured to the steering shaft, b. an idler shaft, c. a 2nd pulley secured to the idler shaft, d. a 1st belt connects the 1st and 2nd pulley in fixed ratio of rotational speed, e. a motor drive shaft, f. a 3rd pulley coupled to the 2nd pulley, g. a 4th pulley secured to the motor drive shaft, h. a 2nd belt means connected to the 3rd and 4th pulley in fixed ratio of rotational speed.

7. The invention of claim 6 wherein one or more of the belts have teeth which interfit with their respective pulleys such that the belts act as timing belts.

8. The invention of claim 5 wherein the motor means rotates clockwise or counterclockwise depending upon the electricity supplied to the motor.

* * * * *